(12) United States Patent
Chen

(10) Patent No.: US 10,509,306 B1
(45) Date of Patent: Dec. 17, 2019

(54) MONOLITHIC LCD PROJECTOR

(71) Applicant: Changsha CRE Electronic Technology Co., Ltd., Changsha (CN)

(72) Inventor: Ling Chen, Changsha (CN)

( * ) Notice: Subject to any disclaimer, the term of this patent is extended or adjusted under 35 U.S.C. 154(b) by 0 days.

(21) Appl. No.: 16/263,150

(22) Filed: Jan. 31, 2019

Related U.S. Application Data

(63) Continuation of application No. PCT/CN2019/073011, filed on Jan. 24, 2019.

(51) Int. Cl.
*G03B 21/14* (2006.01)
*H04N 9/31* (2006.01)
*G03B 21/28* (2006.01)
*G03B 21/00* (2006.01)
*G03B 21/16* (2006.01)
*G03B 21/20* (2006.01)

(52) U.S. Cl.
CPC ........... *G03B 21/28* (2013.01); *G03B 21/006* (2013.01); *G03B 21/16* (2013.01); *G03B 21/2033* (2013.01); *G03B 21/2066* (2013.01)

(58) Field of Classification Search
CPC .... G03B 21/14; G03B 21/005; G03B 21/006; G03B 21/16; H04N 9/31; H04N 9/3102; H04N 9/3108
USPC .............................. 353/31, 37; 348/761, 766
See application file for complete search history.

(56) References Cited

U.S. PATENT DOCUMENTS

| | | | |
|---|---|---|---|
| 5,515,185 A * | 5/1996 | Kim | ..................... H04N 5/7441 349/5 |
| 5,682,216 A * | 10/1997 | Lin | ................... G02F 1/133385 349/122 |
| 2005/0062938 A1 | 3/2005 | Murai et al. | |
| 2012/0113334 A1 | 5/2012 | Minami et al. | |

FOREIGN PATENT DOCUMENTS

CN          108375865 A     8/2018

* cited by examiner

*Primary Examiner* — William C. Dowling
(74) *Attorney, Agent, or Firm* — Erson IP (Nelson IP)

(57) ABSTRACT

A monolithic liquid crystal display (LCD) projector includes a light emitting diode (LED) light source, a condenser, a collimating lens, an LCD light valve, a field lens and a projection lens. The LCD light valve is disposed between the collimating lens and the field lens. The condenser is disposed between the LED light source and the collimating lens. The projection lens is disposed behind the field lens. A first reflector is disposed between the field lens and the projection lens. The first reflector conducts mirror reflection along a long axis thereof. The present disclosure has the characteristics of small volume, novel shape, good color uniformity of the image, good radiating performance and long service life.

7 Claims, 3 Drawing Sheets

MONOLITHIC LCD PROJECTOR

CROSS-REFERENCE TO RELATED APPLICATIONS

This application is a continuation of International Patent Application No. PCT/CN2019/073011 with a filing date of Jan. 24, 2019, designating the United States, now pending. The content of the aforementioned applications, including any intervening amendments thereto, are incorporated herein by reference.

TECHNICAL FIELD

The present disclosure relates to the technical field of projectors, and particularly relates to a monolithic liquid crystal display (LCD) projector.

BACKGROUND OF THE PRESENT INVENTION

The monolithic LCD projector refers to a projector product that amplifies and projects an image of a light valve onto a screen through a projection lens based on Kohler illumination by using a full-color transmission type LCD screen as the light valve. The existing monolithic LCD projectors are classified into a direct projection type monolithic LCD projector and a reflection type monolithic LCD projector according to their optical path structures. The direct projection type monolithic LCD projector is rarely seen in the market because of its larger shape, low volume utilization rate and outdated appearance. For the reflection type monolithic LCD projector, such as a monolithic LCD projector disclosed in a Chinese Patent Application No. 201810522555.0. The length of the projector is significantly reduced while the width of the projector is basically constant, so as to reduce the useless space inside the projector. Under the same conditions, the volume of the projector is smaller. However, the LCD light valve has poor heat radiation performance, and very high requirements for the coating performance of the reflector; otherwise, the reflector has poor reflection performance, resulting in poor color uniformity of the image projected onto the screen, affecting the image quality and limiting the practical effect.

SUMMARY OF PRESENT INVENTION

The purpose of the present disclosure is to overcome the defects of the prior art, to provide a monolithic LCD projector with small volume, novel shape, small image color difference, good radiating performance and more diverse selection of shape.

To achieve the above purpose, the present disclosure provides a monolithic LCD projector including a light emitting diode (LED) light source, a condenser, a collimating lens, an LCD light valve, a field lens and a projection lens, wherein the LCD light valve is disposed between the collimating lens and the field lens; the condenser is disposed between the LED light source and the collimating lens; the projection lens is disposed behind the field lens; a first reflector is disposed between the field lens and the projection lens; and the first reflector conducts mirror reflection along a long axis thereof.

Further, a second reflector is disposed between the condenser and the collimating lens, and the second reflector conducts mirror reflection along a long axis thereof.

Further, an included angle $\theta_1$ between an optical axis of the projection lens and a first reference horizon is $0° \leq \theta_1 \leq 14°$.

Further, an included angle $\theta_2$ between an optical axis penetrating through the LCD light valve and the first reference horizon is $55° \leq \theta_2 \leq 125°$.

Further, an included angle $\theta_3$ between the second reflector and a second first reference horizons $0° \leq \theta_3 \leq 45°$ or $-45° \leq \theta_3 \leq 0°$.

Further, an included angle $\theta_4$ between an optical axis of the condenser and the second first reference horizons $0° \leq \theta_4 \leq 45°$ or $180° \leq \theta_4 \leq 225°$.

Further, radiating air ducts are formed in a spatial clearance between the collimating lens and the LCD light valve and a spatial clearance between the LCD light valve and the field lens; air inlets of the radiating air ducts are positioned on a long side of the LCD light valve; and air outlets are positioned on another long side of the LCD light valve.

The present disclosure has the following beneficial effects:

1. In the present disclosure, the first reflector is disposed between the field lens and the projection lens. Compared with the existing direct projection type monolithic LCD projector, the present disclosure has smaller volume. Moreover, the first reflector is in such an arrangement mode that the first reflector conducts mirror reflection along the long axis thereof. Compared with the existing reflection type monolithic LCD projector, because reflection angles are different, technical requirements for reflector coating are lower, and the manufacturing cost of the first reflectors reduced, thereby reducing the manufacturing cost of the projector.

Meanwhile, the reflector has good reflection performance and better image color uniformity and improves image quality.

2. In the present disclosure, the second reflector is disposed between the condenser and the collimating lens, and the first reflector is disposed between the field lens and the projection lens. Compared with the existing reflection type monolithic LCD projector, the present disclosure has smaller volume, more fully uses the space in the projector and reduces the cost of packaging, transportation and storage. The shape of the projector is changed from a traditional "horizontal" structure to a "vertical" structure, which is obviously creative, thereby further improving the market competitiveness and promoting the development of the monolithic LCD projector. Meanwhile, the first reflector and the second reflector are in such an arrangement mode that first reflector and the second reflector conduct mirror reflection along the long axes thereof. Compared with the existing reflection type monolithic LCD projector, the requirements for reflector coating are lower, the manufacturing cost of the reflectors is reduced, and the yield is increased, thereby reducing the manufacturing cost of the projector. Meanwhile, the reflectors have good reflection performance and small image color difference and improve image quality.

3. In the present disclosure, the radiating air ducts are formed in the spatial clearance between the collimating lens and the LCD light valve and the spatial clearance between the LCD light valve and the field lens; the air inlets of the radiating air ducts are positioned on a long side of the LCD light valve; and the air outlets are positioned on another long side of the LCD light valve. Namely, cooling air enters from a long side of the LCD light valve, and flows out of another long side. The radiating air ducts are short and are good in radiating effect, so as to ensure the consistence of the temperature of the LCD light valve as much as possible and achieve better response speed and brightness uniformity, thereby ensuring that the LCD light valve can provide the best display effect and improving the service life of the LCD light valve to a certain extent.

4. In the present disclosure, the included angle θ1 between the optical axis of the projection lens and the first reference horizon is greater than 0°. Compared with the included angle of 0° between the optical axis of the projection lens and the first reference horizon in the existing reflection type monolithic LCD projector, an image projected onto a screen by the projector can obtain a larger off-axis, and the application scene is wider.

DESCRIPTION OF THE DRAWINGS

To more clearly describe the technical solutions in the embodiments of the present disclosure or in the prior art, the drawings of the solutions required to be used in the description of the embodiments or the prior art will be simply presented below. Apparently, the solutions in the following description are merely some embodiments of the present disclosure, and for those ordinary skilled in the art, other solutions can also be obtained according to these drawing solutions without contributing creative labor.

LIST OF REFERENCE NUMERALS

1 LED light source; 2 condenser; 3 second reflector; 4 collimating lens; 5 LCD light valve; 6 field lens; 7 first reflector; 8 projection lens; 9 first reference horizon; and 10 second reference horizon.

DETAILED DESCRIPTION OF PREFERRED EMBODIMENTS

The present disclosure is further described below in combination with the drawings, but is not intended to limit the scope of the present disclosure.

Embodiment 1

Figure 1:
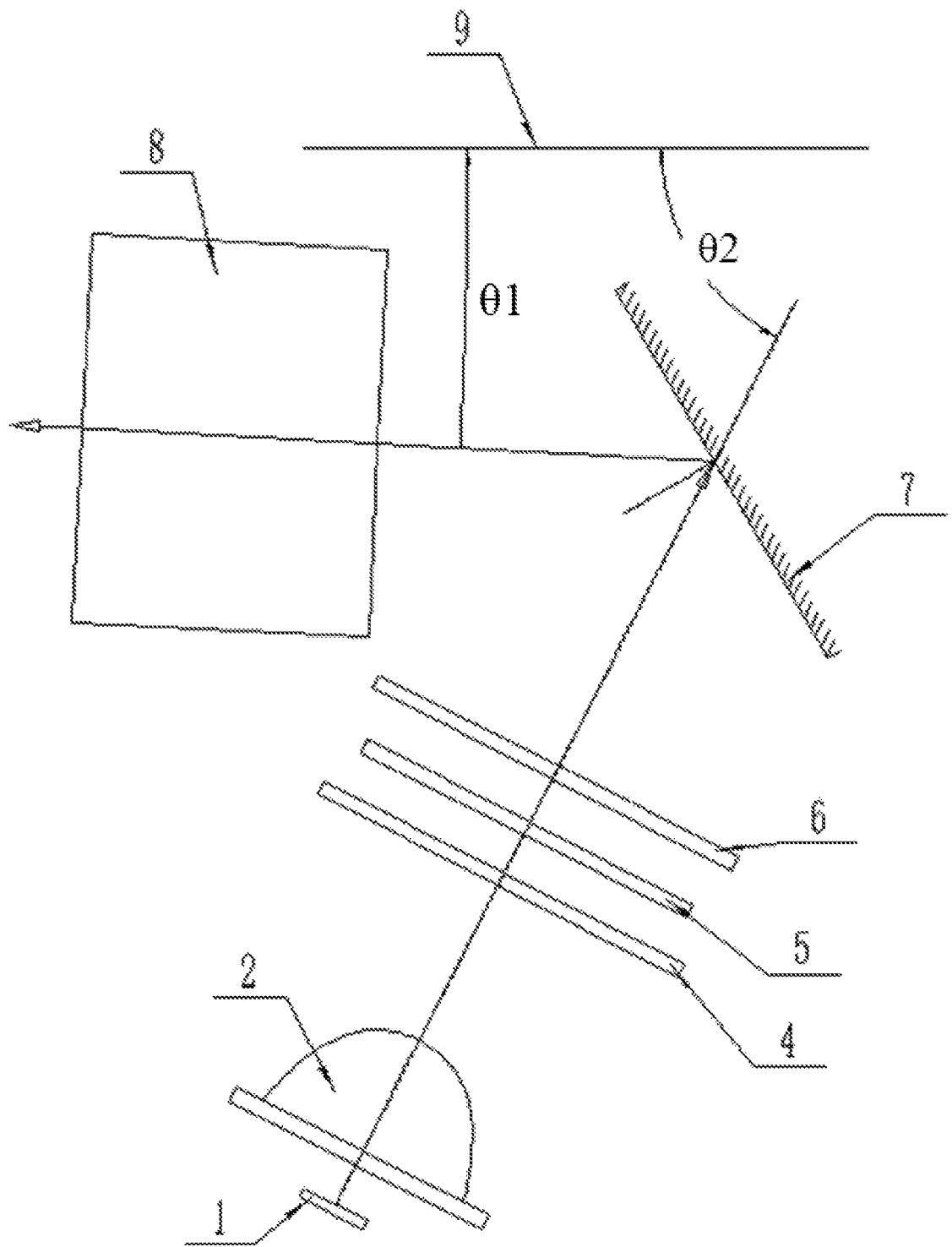
FIG. 1 is a structural schematic diagram of an embodiment 1 of the present disclosure.

As shown in FIG. 1, a monolithic LCD projector provided by the present disclosure includes an LED light source 1, a condenser 2 (or a hollow square taper light pipe), a collimating lens 4, an LCD light valve 5, a field lens 6 and a projection lens 8. The LCD light valve 5 is disposed between the collimating lens 4 and the field lens 6. The condenser 2 is disposed between the LED light source 1 and the collimating lens 4. The projection lens 8 is disposed behind the field lens 6. A first reflector 7 is disposed between the field lens 6 and the projection lens 8, and the first reflector 7 conducts mirror reflection along a long axis thereof.

In the embodiment, the first reflector 7 is disposed between the field lens 6 and the projection lens 8. Compared with the existing direct projection type monolithic LCD projector, the present disclosure has smaller volume. Moreover, the first reflector 7 is in such an arrangement mode that the first reflector 7 conducts mirror reflection along the long axis thereof. Compared with the existing reflection type monolithic LCD projector, technical requirements for coating of the first reflector 7 are lower, and the manufacturing cost of the first reflector 7 is reduced, thereby reducing the manufacturing cost of the projector. Meanwhile, the first reflector 7 has good reflection performance and better image color uniformity and improves the quality of projected images. Meanwhile, the present disclosure provides a novel selection for the shape of the whole projector.

Embodiment 2

Figure 2:
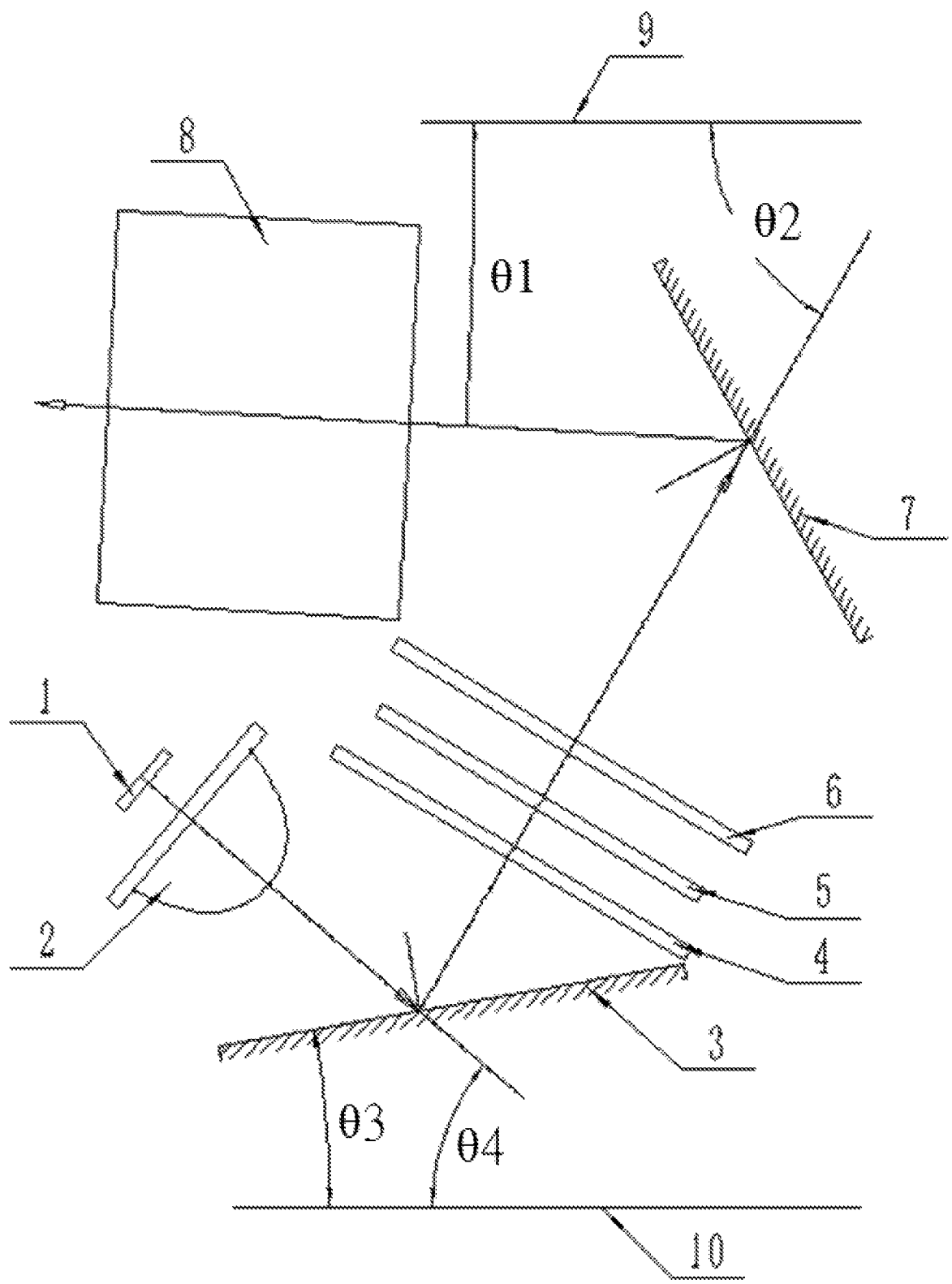
FIG. 2 is a structural schematic diagram 1 of an embodiment 2 of the present disclosure.
Figure 3:
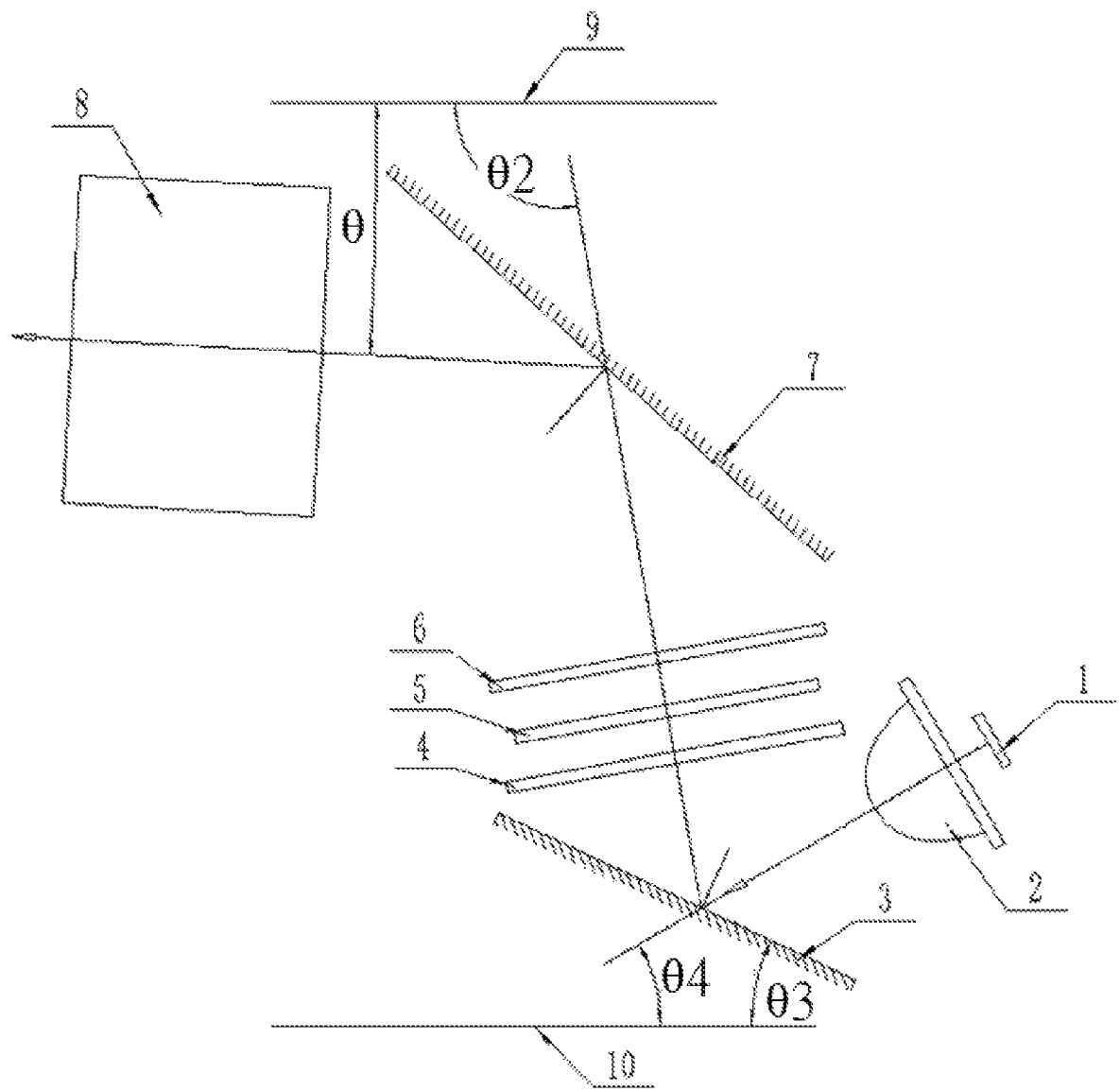
FIG. 3 is a structural schematic diagram 2 of an embodiment 2 of the present disclosure.

As shown in FIGS. 2 and 3, a monolithic LCD projector provided by the present disclosure includes an LED light source 1, a condenser 2, a collimating lens 4, an LCD light valve 5, a field lens 6 and a projection lens 8. The LCD light valve 5 is disposed between the collimating lens 4 and the field lens 6. The condenser 2 is disposed between the LED light source 1 and the collimating lens 4. The projection lens 8 is disposed behind the field lens 6. A second reflector 3 is disposed between the condenser 2 and the collimating lens 4, and a first reflector 7 is disposed between the field lens 6 and the projection lens 8. The second reflector 3 conducts mirror reflection along a long axis thereof. The first reflector 7 conducts mirror reflection along a long axis thereof.

In the embodiment, the second reflector 3 is disposed between the condenser 2 and the collimating lens 4, and the first reflector 7 is disposed between the field lens 6 and the projection lens 8. Compared with the existing reflection type monolithic LCD projector, the present disclosure has smaller volume, more fully uses the space in the projector, reduces the cost of packaging, transportation and storage, further improves the market competitiveness and promotes the development of the monolithic LCD projector. Meanwhile, the second reflector 3 and the first reflector 7 are in such an arrangement mode that the second reflector 3 and the first reflector 7 conduct mirror reflection along the long axes thereof. Compared with the existing reflection type monolithic LCD projector, the coating cost of the reflector 3 is lower and the manufacturing cost of the reflector 3 is reduced, thereby reducing the manufacturing cost of the projector. Meanwhile, the reflector 3 has good reflection performance and small image color difference and improves image quality.

The existing LCD light valve 5 is in a non-square form, and exists in the form of some aspect ratio, such as common display devices with aspect ratios of "4:3", "16:9", "16:10" and "2:1". Generally, a larger side of the LCD light valve 5 is called a "long side" or a "long side direction", and a smaller side is called a "short side" or a "short side direction". Vertical bisectors of the LCD light valve 5 are made. A bisector that is parallel to the long side is called a "long axis", and a bisector that is parallel to the "short side" is called a "short axis". Similarly, long axes and short axes of the screen, the second reflector 3 and the first reflector 7 are defined in a similar way to the LCD light valve 5. According to the principle of the reflector, if the image on the screen is mirrored along the short axis of the first reflector 7, the first reflector 7 is considered to conduct "short axis mirror reflection". Similarly, if the image on the screen is mirrored along the long axis of the first reflector 7, the first reflector 7 is considered to conduct "long axis mirror reflection". In the above embodiment, the first reflector 7 conducts mirror reflection along the long axis. According to the principle of the reflector, when the first reflector 7 reflects the light on an optical path, if the image is mirrored along the short axis of the first reflector 7, the angle difference of the light at the edge of the first reflector 7 will be much greater than the angle difference when the image is mirrored along the long axis. However, if the angle difference is larger, the coating cost of the first reflector 7 is higher and the reflection performance of the first reflector 7 is also lower. Therefore, if the first reflector 7 conducts mirror reflection along the long axis, the first reflector 7 has better cost performance and properties. Similarly, if the second reflector 3 conducts mirror reflection along the long axis, the second reflector 3 has better cost performance and properties.

During the operation of the projector, the blocked light is converted into heat in the form of absorption on the LCD light valve 5. Thus, most of the light becomes a heat source. The LCD light valve 5 has poor heat radiation capacity due to the particularity of its structure (its surface is made of glass or polarized material, and the interior includes a CF film, liquid crystal and a TFT). Therefore, when the temperature reaches a certain level, the TFT (thin film transistor) and the liquid crystal that form the LCD light valve start to fail and produce various abnormalities, causing that the LCD light valve 5 cannot continue to work. Therefore, to ensure normal operation of the LCD light valve 5, the projector needs to radiate heat from the LCD light valve 5 in such a cooling mode that an axial flow fan or a blower removes heat from the surface of the LCD light valve 5 or a radiating fan of the LED light source 1 pumps out the heat from the surface of the LCD light valve 5 through a properly designed air duct.

In the above embodiment, further preferably, as shown in FIGS. 1-3, radiating air ducts are formed in a spatial clearance between the collimating lens 4 and the LCD light valve 5 and a spatial clearance between the LCD light valve 5 and the field lens 6. Air inlets of the radiating air ducts are positioned on a long side of the LCD light valve 5, and air outlets are positioned on another long side of the LCD light valve 5. Namely, cooling air enters from a long side of the LCD light valve 5, and flows out of another long side. When the cooling air passes through the radiating air ducts, more heat can be taken away at a side of the air inlets because of a large surface temperature difference between the cooling air and the LCD light valve 5, and better radiating capacity is good. As the air moves forward in the radiating air ducts, the cooling air continuously takes away the heat on the surface of LCD light valve 5, and is continuously exchanged and heated by the heat on the surface of the LCD light valve 5. With the increase of the temperature of the cooling air and the gradual decrease of the surface temperature difference between the cooling air and the LCD light valve 5, the eliminated heat will be reduced. However, in the present embodiment, a distance from one long side to another long side of the LCD light valve 5 is short and the radiating air ducts are short, so that the temperature difference of the cooling air between the air inlets and the air outlets is small, thereby eliminating more heat and achieving good radiating effect, so as to ensure the consistence of the temperature, response speed and brightness uniformity of the LCD light valve 5. The service life of the LCD light valve 5 is greatly prolonged, thereby prolonging the service life of the projector and reducing later maintenance cost. Meanwhile, the LCD light valve 5 can bear stronger illumination, thereby improving output brightness of the projector and further enhancing the brightness of the image.

In the above embodiment, further preferably, as shown in FIGS. 1-3, an included angle θ1 between an optical axis of the projection lens 8 and a first reference horizon 9 is θ1≥0°, preferably 0≤θ1≤14°, and further preferably 0°<θ1≤14°. If an image projected onto the screen by the projector can obtain a larger off-axis, when the projector is horizontally placed on the table, the defect that the image may be blocked by the table can be avoided in case of no off-axis design.

Thus, the application scene is wider. Further preferably, in embodiment 1 and embodiment 2, an included angle θ2 between an optical axis penetrating through the LCD light valve 5 and the first reference horizon 9 is 55°≤θ2≤125°. In embodiment 2, an included angle θ3 between the second reflector 3 and a second reference horizon 10 is 0°≤θ3≤45° (in FIG. 2) or −45°≤θ3≤0° (in FIG. 3). An included angle θ4 between an optical axis of the condenser 2 and the second reference horizon 10 is 0°≤θ4≤45° (in FIG. 2) or 180°≤θ4≤225° (in FIG. 3). The first reference horizon 9 is parallel to the second reference horizon 10. Each angle in the above embodiments is preferred, to ensure that the projector has smaller volume, more fully use the space in the projector, and reduce the cost of packaging, transportation and storage. The shape of the projector is changed from a traditional "horizontal" structure to a "vertical" structure, which is obviously creative, thereby further improving the market competitiveness and promoting the development of the monolithic LCD projector.

In the above embodiments, compared with the direct projection type monolithic LCD projector and the reflection type monolithic LCD projector, the projection of the present disclosure is based on "equivalent optical design parameters" (note: the equivalent optical design parameters mean that parameters and dimensions of the LED light source 1, the condenser 2, the collimating lens 4, the LCD light valve 5, the field lens 6 and the projection lens 8 are identical. Thus, the length dimensions of the optical paths are consistent, so that the power and a radiating system of the projector are also similar or consistent).

The above shows and describes the basic principle, main features and advantages of the present disclosure. Those skilled in the art shall know that, the present disclosure is not limited by the above embodiments; only the principles of the present disclosure are described in the above embodiments and the description; various changes and improvements can be made to the present disclosure without deviating from the spirit and the scope of the present disclosure; and these changes and improvements belong to the protection scope of the present disclosure. The protection scope of the present disclosure is defined by the appended claims and its equivalents.

I claim:

1. A monolithic liquid crystal display (LCD) projector, comprising a light emitting diode (LED) light source (1), a condenser (2), a collimating lens (4), an LCD light valve (5), a field lens (6) and a projection lens (8), wherein the LCD light valve (5) is disposed between the collimating lens (4) and the field lens (6); the condenser (2) is disposed between the LED light source (1) and the collimating lens (4); the projection lens (8) is disposed behind the field lens (6), a first reflector (7) is disposed between the field lens (6) and the projection lens (8), and the first reflector (7) conducts mirror reflection along a long axis thereof.

2. The monolithic LCD projector according to claim 1, wherein a second reflector (3) is disposed between the condenser (2) and the collimating lens (4), and the second reflector (3) conducts mirror reflection along a long axis thereof.

3. The monolithic LCD projector according to claim 1, wherein an included angle θ1 between an optical axis of the projection lens (8) and a first reference horizon (9) is 0°≤θ1≤14°.

4. The monolithic LCD projector according to claim 1, wherein an included angle θ2 between an optical axis penetrating through the LCD light valve (5) and the first reference horizon (9) is 55°≤θ2≤125°.

5. The monolithic LCD projector according to claim 2, wherein an included angle θ3 between the second reflector (3) and a second reference horizon (10) is $0° \leq θ3 \leq 45°$ or $-45° \leq θ3 \leq 0°$.

6. The monolithic LCD projector according to claim 2, wherein an included angle θ4 between an optical axis of the condenser (2) and the second reference horizon (10) is $0° \leq θ4 \leq 45°$ or $180° \leq θ4 \leq 225°$.

7. The monolithic LCD projector according to claim 1, wherein radiating air ducts are formed in a spatial clearance between the collimating lens (4) and the LCD light valve (5) and a spatial clearance between the LCD light valve (5) and the field lens (6); air inlets of the radiating air ducts are positioned on a long side of the LCD light valve (5); and air outlets are positioned on another long side of the LCD light valve (5).

* * * * *